(12) United States Patent
Iizuka

(10) Patent No.: US 6,731,417 B2
(45) Date of Patent: May 4, 2004

(54) SCANNING OPTICAL SYSTEM

(75) Inventor: Takashi Iizuka, Saitama-ken (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 10/026,608

(22) Filed: Dec. 27, 2001

(65) Prior Publication Data
US 2002/0122234 A1 Sep. 5, 2002

(30) Foreign Application Priority Data
Dec. 28, 2000 (JP) ........................................ 2000-400183

(51) Int. Cl.[7] .............................................. G02B 26/08
(52) U.S. Cl. ........................ 359/204; 359/205; 359/216; 359/212
(58) Field of Search ........................ 359/204, 205–207, 359/216–219, 831, 837; 347/232, 233, 234, 235, 243–244; 250/234–236

(56) References Cited

U.S. PATENT DOCUMENTS

| 5,739,940 A | * | 4/1998 | Kondo | 359/204 |
| 5,841,566 A | * | 11/1998 | Minakuchi et al. | 359/204 |
| 6,115,164 A |  | 9/2000 | Kamikubo |  |
| 6,124,962 A |  | 9/2000 | Kamikubo |  |
| 6,178,029 B1 |  | 1/2001 | Kamikubo |  |
| 6,259,547 B1 |  | 7/2001 | Kamikubo |  |
| 6,501,585 B2 | * | 12/2002 | Shiraishi et al. | 359/204 |

* cited by examiner

Primary Examiner—James Phan
(74) Attorney, Agent, or Firm—Greenblum & Bernstein, P.L.C.

(57) ABSTRACT

A multi-beam scanning optical system is provided with a plurality of light sources that emit a plurality of laser beams having different wavelengths, respectively, a single deflector which deflects the plurality of laser beams simultaneously, an imaging optical system that converges the plurality of laser beams deflected by the single deflector on the surface to be scanned, lateral chromatic aberration of the imaging optical system being compensated, and a beam detector that receives the plurality of laser beams directed to outside the predetermined imaging area, a synchronizing signal being generated upon detection of each of the plurality of light beams by the beam detector. Further, the scanning optical system includes a dispersion element inserted in optical paths of the laser beams directed to the beam detector, the dispersion element being configured such that the laser beams directed to the beam detector are shifted in the scanning direction.

7 Claims, 5 Drawing Sheets

SCANNING OPTICAL SYSTEM

BACKGROUND OF THE INVENTION

The present invention relates to a scanning optical system for a laser beam printer or the like, and particularly to a multi-beam scanning optical system using a plurality of beams.

Conventionally, a multi-beam scanning optical system has been widely employed. The multi-beam scanning optical system is advantageous in that a plurality of scanning lines can be formed simultaneously. The multi-beam scanning optical system typically includes a plurality of laser sources respectively emitting a plurality of laser beams. The plurality of laser beams are simultaneously deflected by a polygonal mirror. The deflected laser beams passes through an fθ lens, which converges the plurality of laser beams on a surface, such as a photoconductive surface of a photoconductive drum, to be scanned to form a plurality of beam spots. As the polygonal mirror rotates, the beam spots formed on the photoconductive drum move to form a plurality of scanning lines thereon. The direction in which the beam spots move is parallel with the rotational axis of the photoconductive drum. Further, the photoconductive drum is rotated so that the photoconductive surface thereof is two-dimensionally exposed to the plurality of beams.

In this specification, a direction in which the beam spots move (i.e., a direction in which the scanning lines extend) will be referred to as a main scanning direction. Further, a direction in which the surface to be scanned moves with respect to the scanning lines, i.e., the rotation direction of the photoconductive drum will be referred to as an auxiliary scanning direction. In the following description, the shape of optical elements, directions of powers of the optical elements and the like are described with reference to the main and auxiliary scanning directions on the surface to be scanned. That is, if an optical element is described to have a refractive power in the main scanning direction, the power affects the beam in the main scanning direction on the surface to be scanned regardless of the orientation of the element.

In the multi-beam scanning optical system, all the beam spots should move within (i.e., traverse) a width of an imaging area so that the imaging area can be exposed to the beams. If the plurality of beam spots are arranged to align obliquely with respect to the main scanning direction, the scanning lines formed by the plurality of beam spots are shifted with each other in the main scanning direction. In such a case, it becomes necessary to elongate a width of each scanning line so that each beam traverses the imaging area. In order to elongate the scanning lines, it becomes necessary to use a larger polygonal mirror to broaden a deflection angle at which each beam scans. In view of a recent trend of downsizing of the imaging apparatus, it is not preferable to have such a configuration, and the plurality of beams are preferably aligned along a line which is perpendicular to the main scanning direction.

Generally, a scanning optical system is provided with a synchronizing signal detecting optical system for detecting a scanning position of each beam, which is used for controlling an imaging start point of each scanning line.

A typical synchronizing signal detecting optical system includes a photo sensor which detects a laser beam before it enters the imaging area. A predetermined period after the photo sensor detects the laser beam, modulation of the laser beam is started so that the image is formed from the imaging start position (i.e., the upstream end of the imaging area). If all of the plurality of beams are located at the same position in the main scanning direction, all the laser beams are incident on the photo sensor at the same time. Then, a single pulse signal is output by the photo sensor as the synchronizing signal. In such a case, all of the plurality of beams are started to be modulated after the same predetermined period has passed after the output of the pulse signal.

Practically, it is difficult to arrange the plurality of scanning lines at the same positions in the main scanning direction. It is because, all the beam spots are difficult to be aligned at an initial setting stage, and/or due to an external reason such as an oscillation at use, the relative positions of the plurality of beams may be changed to shift from each other in the main scanning direction. If two beam spots are slightly shifted in the main scanning direction, two pulse signals are output by the photo sensor within a very short period of time. In such a case, whichever pulse signal is used as the synchronizing signal, one of the two beam spots is not started to be modulated accurately, and therefore, the imaging start point of one of the two scanning lines is shifted from the predetermined position.

SUMMARY OF THE INVENTION

It is therefore an object of the invention to provide an improved multi-beam scanning optical system in which a plurality of scanning lines formed by a plurality of beams are aligned in the main scanning direction, and further, an imaging start point of each scanning line can be adjusted accurately.

For the above object, according to the present invention, there is provided a scanning optical system used for exposing a predetermined imaging area on a surface to be scanned to a plurality of laser beams. The scanning optical system is provided with a plurality of light sources that emit a plurality of laser beams having different wavelengths, respectively, a single deflector which deflects the plurality of laser beams simultaneously, an imaging optical system that converges the plurality of laser beams deflected by the single deflector on the surface to be scanned, lateral chromatic aberration of the imaging optical system being compensated, and a beam detector that receives the plurality of laser beams directed to outside the predetermined imaging area, a synchronizing signal being generated upon detection of each of the plurality of light beams by the beam detector. Further, the scanning optical system includes a dispersion element inserted in optical paths of the laser beams directed to the beam detector, the dispersion element being configured such that the laser beams directed to the beam detector are shifted in the scanning direction.

According to the optical scanning systems configured as above, beam spots formed on the surface to be scanned is aligned in the scanning direction within the imaging area, while the timings at which the beams traverse the light receiving element are differentiated so that synchronizing signals for respective beams can be generated. Therefore, the imaging start position can be accurately adjusted. Further, the imaging start points for the two laser beams can be adjusted in the main scanning direction even if the relative positions of the beam spots are shifted due to the error in the initial settings or some external disturbance.

Optionally, the beam detector detects the laser beams passed through at least a part of the imaging optical system. That is, the imaging optical system may include a plurality of lens elements, and the beams directed to the light receiving element may not pass through all of the lens elements.

In a particular case, the beam detector may include a single light receiving element, each of the plurality of laser beams being incident on the single light receiving element.

In this case, the plurality of laser beams incident on the imaging area are aligned in the scanning direction, and wherein the plurality of laser beams are incident on the single light receiving element at different timings.

Further optionally, the dispersion element may include a prism. Alternatively, the dispersion element may include an optical element formed with a diffraction surface which separates the plurality of laser beams in the scanning direction.

In the above case, the dispersion element may include a reflection type optical element that bends optical paths of the plurality of laser beams. By appropriately bending the optical paths of the beams which are used for generating the synchronizing signals, a space required for accommodating the entire scanning optical system can be reduced.

BRIEF DESCRIPTION OF THE ACCOMPANYING DRAWINGS

FIG. 1 schematically shows an arrangement of optical elements of a scanning optical system according to a first embodiment of the invention;

Figure 3:
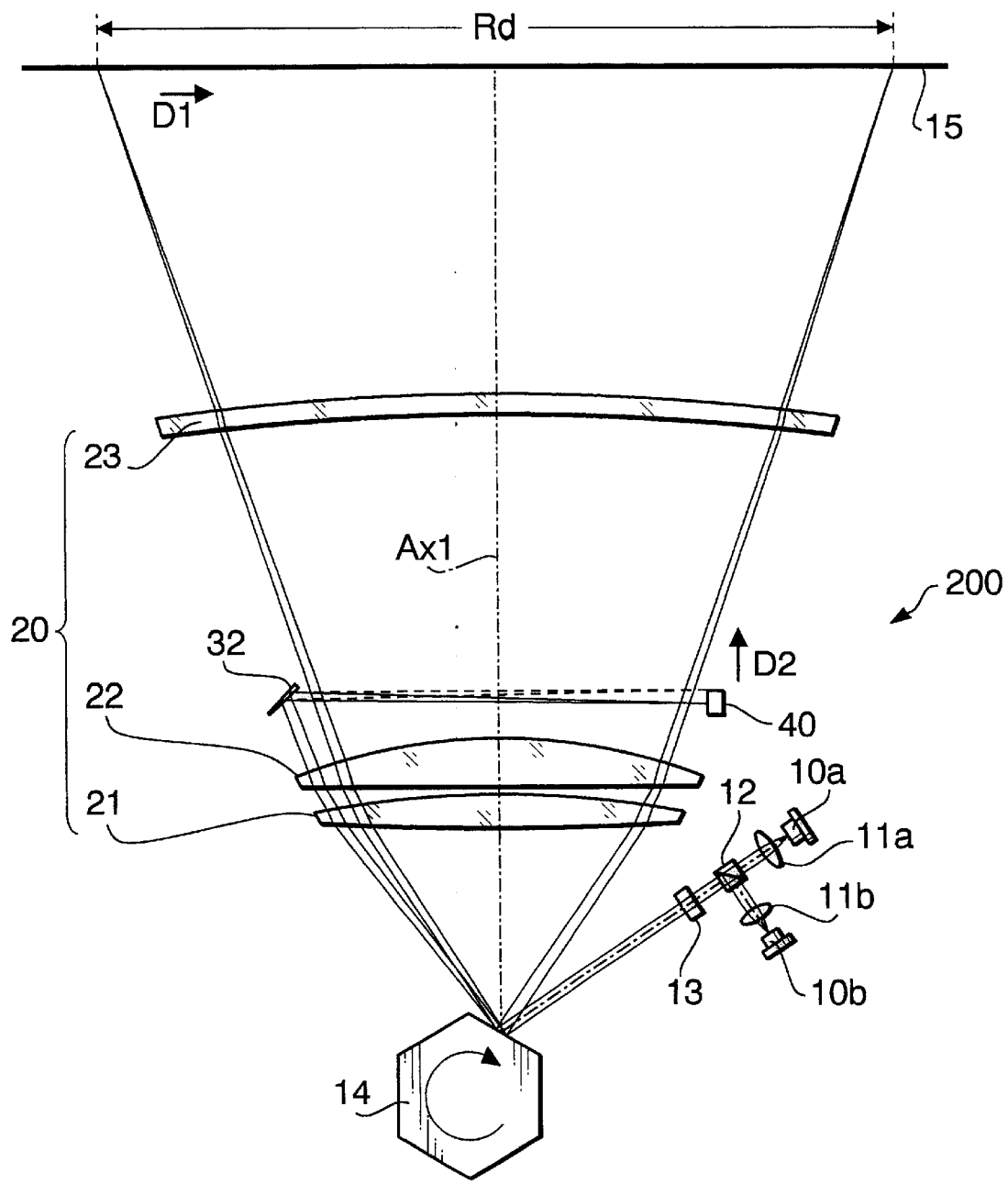
Figure 4:
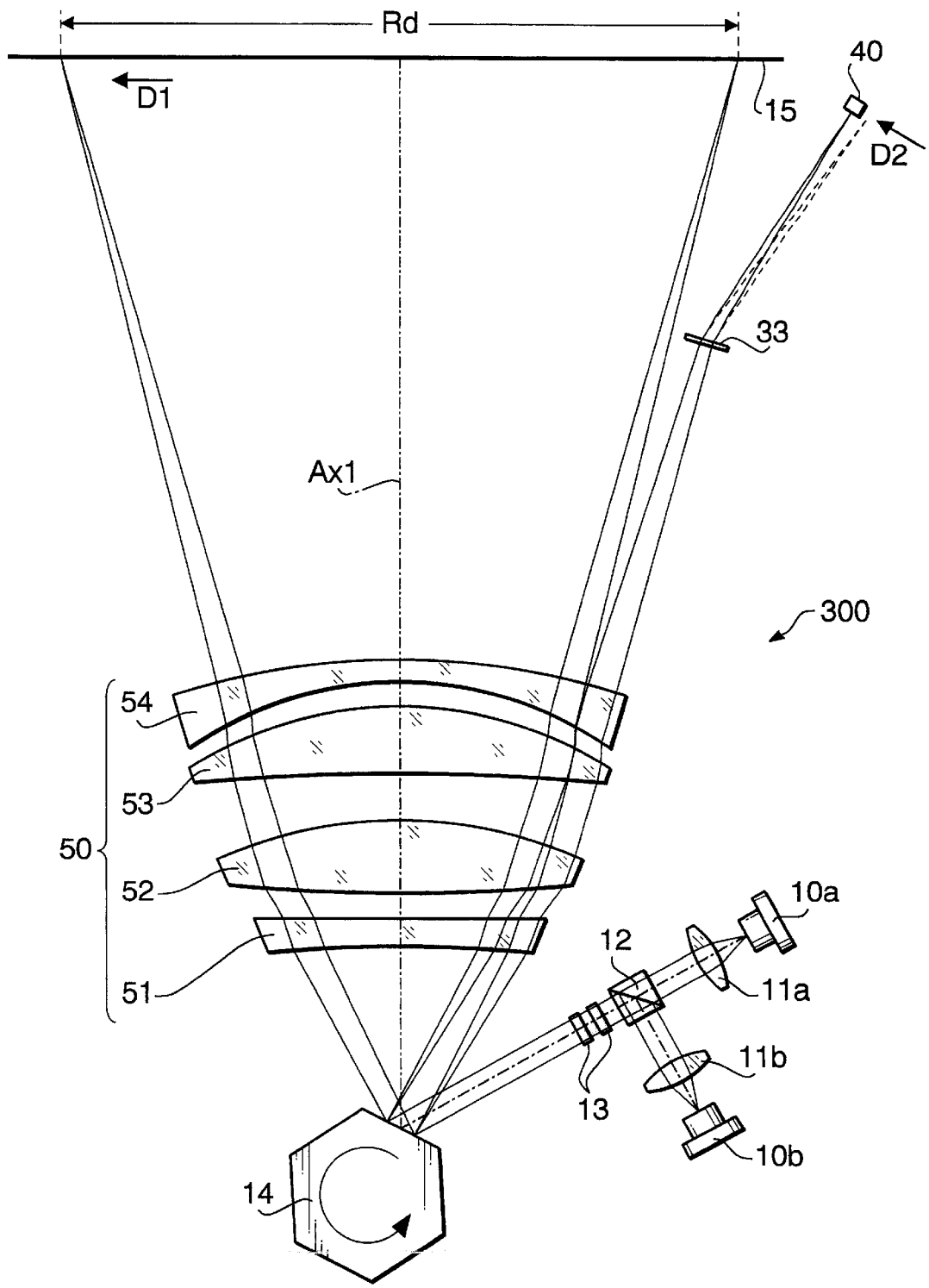
Figure 5:
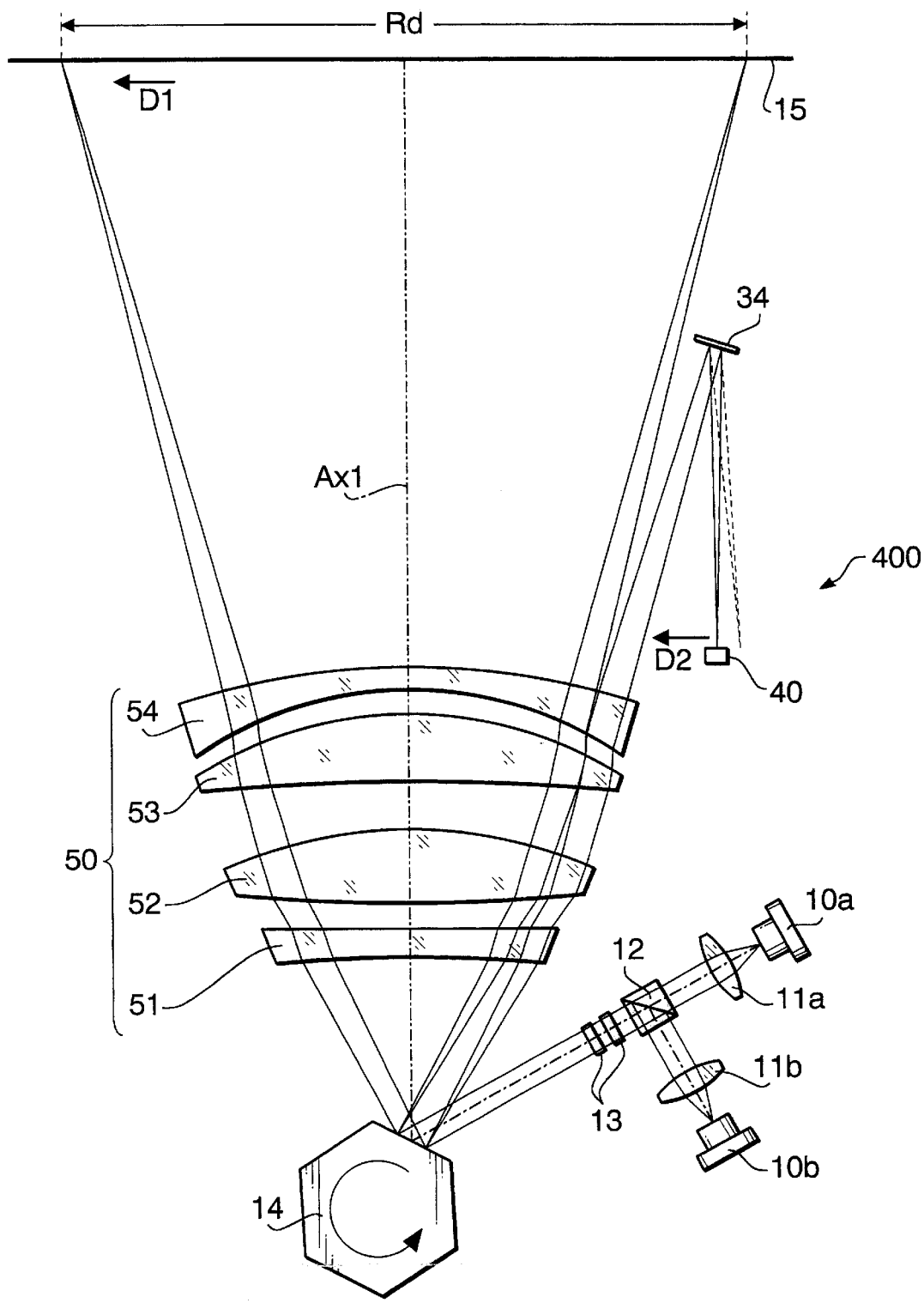

FIG. 3 schematically shows an arrangement of optical elements of a scanning optical system according to a second embodiment of the invention;

FIG. 4 schematically shows an arrangement of optical elements of a scanning optical system according to a third embodiment of the invention; and FIG. 5 schematically shows an arrangement of optical elements of a scanning optical system according to a fourth embodiment of the invention.

DESCRIPTION OF THE EMBODIMENT

Hereinafter, the scanning optical systems according to first to fourth embodiments of the invention will be described with reference to the accompanying drawings.

First Embodiment

Figure 1:
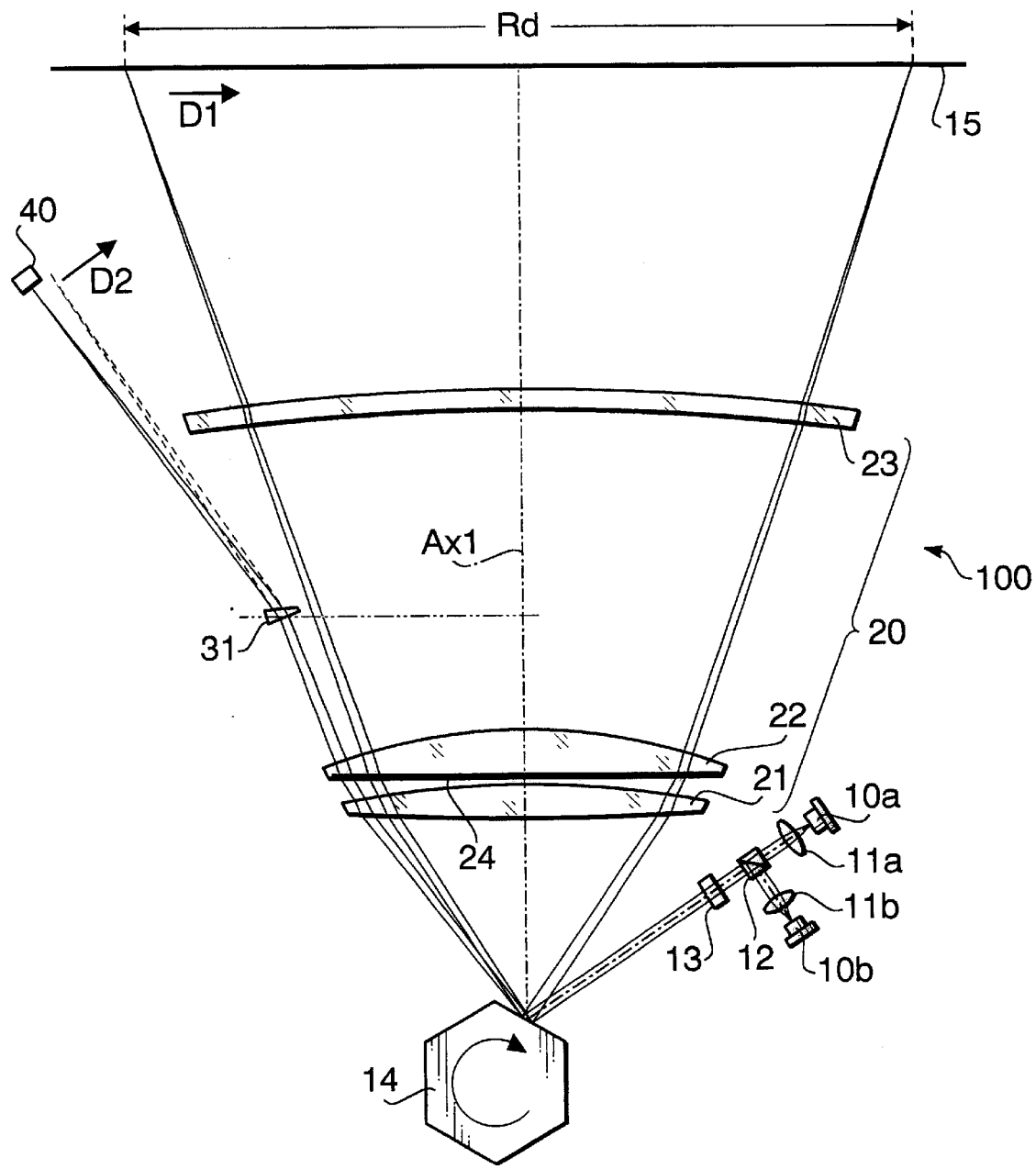

FIG. 1 schematically shows an arrangement of optical elements of a scanning optical system 100 according to a first embodiment of the invention. The scanning optical system 100 shown in FIG. 1 is an exposure unit for a laser beam printer. The exposure unit emits a scanning laser beam, which is ON/OFF modulated in accordance with an image to be formed. The scanning beam is converged on a surface 15 to be scanned. The surface 15 is, for example, a surface of a photoconductive drum, and an electrostatic latent image is formed thereon.

The scanning optical system 100 shown in FIG. 1 includes first and second laser diodes 10a and 10b, which emit two laser beams having different wavelengths, respectively. The laser beams are collimated by the collimating lenses 11a and 11b, respectively, and are directed in the same direction by a beam combiner 12. The beam combiner 12 is configured such that, in accordance with the polarizing characteristics of the laser beams, the laser beam emitted by the first laser diode 10a is transmitted through the beam combiner 12, and the laser beam emitted by the second laser diode 10b is reflected by the beam combiner 12.

The two laser beams emerged from the beam combiner 12 are converged by a cylindrical lens 13, which has a positive power only in an auxiliary scanning direction. The two laser beams passed through the cylindrical lens 13 are deflected simultaneously by a polygonal mirror 14, which rotates at a predetermined angular speed.

It should be noted that the two laser beams are incident on the polygonal mirror 14 at the same angle, with respect to a reflection surface thereof, in the main scanning direction. The two laser beams, however, strike two different positions on the reflection surface of the polygonal mirror 14, respectively, i.e., at positions along a line extending in the auxiliary scanning direction.

With this configuration, in the main scanning direction, each reflection surface of the polygonal mirror 14 has the same size as that of a polygonal mirror for a single laser beam. Therefore, although a plurality of beams are used, the size of the polygonal mirror 14 is not enlarged at least in the main scanning direction.

The laser beams deflected by the polygonal mirror 14 are converged on the surface 15 via an fθ lens 20, which is an imaging lens consisting of three lens elements, and form two beam spots. In the embodiment, the polygonal mirror 14 rotates clockwise in FIG. 1, and the two beam spots formed on the surface 15 move in direction D1 as the polygonal mirror 14 rotates.

The fθ lens 20 includes, from the polygonal mirror side to the surface 15, a biconvex lens (first lens) 21 having a positive power both in the main and auxiliary scanning directions, a plano-convex lens (second lens) 22 having a positive power both in the main and auxiliary scanning direction, and an elongated lens 23 (third lens) having a positive power substantially only in the auxiliary scanning direction. The first and second lenses 21 and 22 are arranged closer to the polygonal mirror 14, while the third lens 23 is arranged at an intermediate position between the polygonal mirror 14 and the surface 15.

Figure 2A:
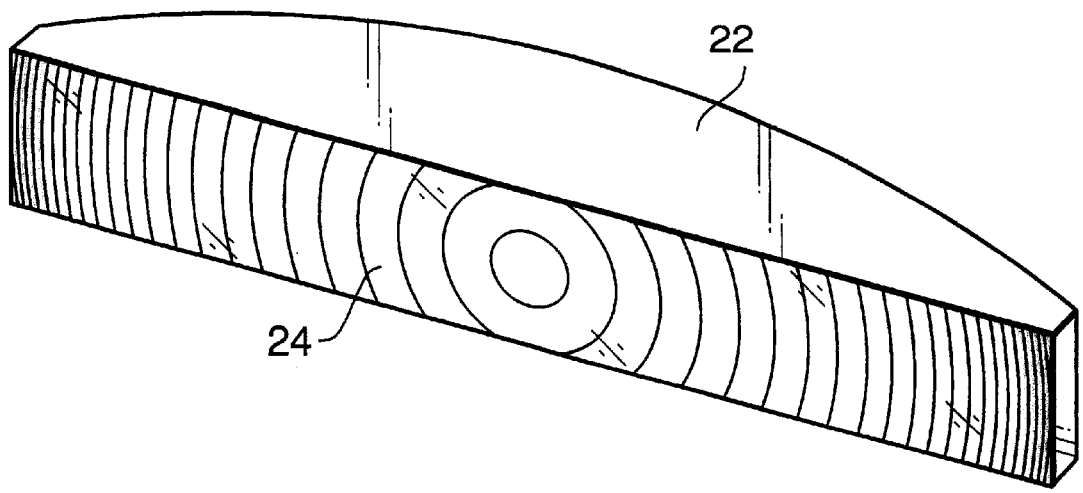
FIG. 2A is a perspective view of a lens showing a diffractive lens structure formed thereon.
Figure 2B:
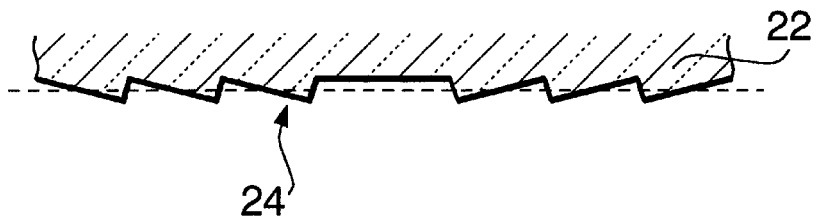
FIG. 2B is an enlarged cross sectional view showing the diffractive lens structure.

On the polygonal mirror side surface of the second lens 22, a diffractive lens structure 24 is formed. The diffractive lens structure 24 has a concentric pattern about an optical axis as shown in FIG. 2A. As shown in FIG. 2B, which is an enlarged cross sectional view, the concentric pattern has a stepped structure. The diffractive lens structure 24 functions to compensate for a lateral chromatic aberration due to the refractive lens elements of the fθ lens 20. With this function of the diffractive lens structure 24, the two beam spots formed by two laser beams having different wavelengths scan simultaneously at the same position in the main scanning direction within an imaging area Rd (see FIG. 1). Since the beam spots are separated in the auxiliary scanning direction, two scanning lines (i.e., loci of the scanning beam spots) are formed on the surface 15 at one scan.

As shown in FIG. 1, a prism 31 is arranged, at a position where the laser beams directed to outside the imaging area Rd pass, between the second lens 22 and the third lens 23. The prism 31 refract the beams outward with respect to the optical axis of the scanning optical system. The beams (which will be referred to as monitor beams) passed through the prism 31 are converged on a light receiving element 40, which functions as a synchronizing signal detection system. The monitor beams move in direction D2, and traverses the light receiving element 40 every time the surface of the polygonal mirror 14 on which the beam is incident changes, before the beam spots traverse the imaging area Rd. Since the prism 31 has a predetermined dispersion, the first laser beam emitted by the first laser diode 10a and the second laser beam emitted by the second laser diode 10b are separated, as indicated by solid lines and broken lines, respectively, in the scanning direction D2. Therefore, at each scan, the light receiving element 40 outputs two pulses which are used for controlling the laser diodes 10a and 10b so that modulation starts when each beam reaches the imaging start point at every scan.

For example, if the laser beam, which has a wavelength of λ1 and is emitted by the first laser diode 10a, traverses the light receiving element 40 firstly, and then, the laser beam, which has a wavelength of λ2 and is emitted by the second laser diode 10b, traverses the light receiving element 40, due to the dispersion of the prism 31, the firstly output synchronizing pulse is used for adjusting the imaging start position corresponding to the laser beam emitted by the first laser diode 10a, and the secondly output synchronizing pulse is used for adjusting the imaging start position corresponding to the laser beam emitted by the second laser diode 10b.

In the embodiment, a reference status is defined as a status where the two beam spots pass the imaging start point of the imaging area Rd at the same time, while a time difference between the first synchronizing pulse and the second synchronizing pulse when the two beams traverse the light receiving element 40 is Δt0. Given that a period of time between the first synchronizing pulse and a time when the first beam spot reaches the imaging start point is Δt1, a time period between the second synchronizing pulse and a time when the second beam spot reaches the image start point is represented by Δt1−Δt0.

As above, the laser diodes 10a and 10b are controlled based on the synchronizing pulses output at different timings, respectively.

Even when the beam spots are shifted from each other within the imaging area Rd due to errors of initial settings or external disturbances, it is possible to adjust the positions of the beam spots according to the embodiment.

For example, if a beam spot formed by the laser beam whose wavelength is λ1 antecedes a beam spot formed by the laser beam whose wavelength is λ2 by a time period of Δt2, a period of time between the first synchronizing pulse and a time when the first beam spot reaches the imaging start point is set to Δt1, and a time period between the second synchronizing pulse and a time when the second beam spot reaches the imaging start point is set to Δt1−Δt0. In this case, the second laser diode 10b is controlled to be driven earlier than in the above case (i.e., the beams are in the reference status) by Δt2, and at this timing, the beam spot formed by the second laser beam is located at the imaging start point. Thus, with the above control, the imaging start points of the two beams can be adjusted in the main scanning direction.

Next, a numerical example of the above-described scanning optical system will be indicated. In this example, the wavelength λ1 is 680 (nm) and the wavelength λ2 is 780 (nm). TABLE 1 below indicates a numerical structure of the scanning optical system 100 on the surface 15 side elements with respect to the cylindrical lens 13. A symbol ry represents a radius of curvature in the main scanning direction, a symbol rz represents a radius of curvature in the auxiliary scanning direction (which is omitted when a surface is rotationally symmetrical), d represent a distance between adjacent surfaces on the optical axis, and n680 and n780 respectively denote refractive indexes for wavelengths of 680 nm and 780 nm. In TABLE 1, surface #1 represents a reflection surface of the polygonal mirror 14, surfaces #2 and #3 represent those of the first lens 21, surfaces #4 and #5 represent those of the second lens 22, and surfaces #6 and #7 represent those of the third lens 23 of the fθ lens 20.

TABLE 1

| scanning width 210 mm | | | focal length in the main scanning direction 180.31 mm | |
| --- | --- | --- | --- | --- |
| surface number | ry | rz | d | n680 | n780 |
| #1 | inf. | | 55.000 | | |
| #2 | 1000.000 | | 8.350 | 1.48849 | 1.48617 |
| #3 | −270.000 | | 2.000 | | |
| #4 | inf. | | 12.530 | 1.48849 | 1.48617 |
| #5 | −154.500 | | 86.680 | | |
| #6 | −700.000 | 28.850 | 5.000 | 1.48849 | 1.48617 |
| #7 | −670.000 | | 85.200 | | |

Surface #2 (i.e., the polygonal mirror side surface of the first lens 21) is an aspherical surface rotationally symmetrical with respect to the optical axis thereof. The rotationally symmetrical aspherical surface is generally expressed by SAG (i.e., a distance from a plane tangential to the surface on the optical axis) X(h), which is a function of a height h of a point on the aspherical surface from the optical axis. The function is expressed by formula (1).

$$X(h) = \frac{Ch^2}{1 + \sqrt{1 - (1+K)C^2h^2}} + A_4h^4 + A_6h^6 + A_8h^8 \quad (1)$$

where, C is a curvature (i.e., 1/ry) of the aspherical surface on the optical axis, K is a conical coefficient, and A4, A6, A8 are fourth, sixth and eighth order aspherical coefficients.

In TABLE 1, ry for surface #2 represents the radius on the optical axis, and the conical coefficient K and the fourth, sixth and eighth order aspherical coefficients for the function (1) are indicated in TABLE 2 below.

TABLE 2

| K | 0.4359 |
| --- | --- |
| A4 | −1.05000 × 10$^{-7}$ |
| A6 | 1.53885 × 10$^{-11}$ |
| A8 | −1.22494 × 10$^{-15}$ |

Each of the surfaces #3, #5 and #7 (i.e., the surface 15 side surface of the first lens 21, second lens 22 and third lens 23) is a spherical surface. The surface #6 (i.e., the polygonal mirror side surface of the third lens 23) is a toric surface. The surface #4 (i.e., the polygonal mirror side surface of the second lens 22) is configured such that the diffraction lens structure 24 is formed on a base curve that is a planar surface.

The steps and pitch of the diffractive lens structure 24 are determined such that the focal length of the diffraction lens structure 24 for the light whose wavelength is 780 nm is 4871.802 mm.

The prism 31 is a transparent prism which is configured such that its apex angle is 20°, refractive indexes n680=1.77358 and n780=1.76591, and the central thickness is 5.0 mm.

The light receiving element 40 is arranged at a position apart from the prism 31 by 109.2 mm. A distance between the two beams on the light receiving element is 0.373 mm.

Second Embodiment

FIG. 3 shows an arrangement, within a main scanning plane, of optical elements of a scanning optical system 200 according to a second embodiment. The scanning optical system 200 is similar to the scanning optical system 100 except that the prism 31 is replaced with a reflective type dispersive prism 32, and the light receiving element 40 is arranged so as to receive the laser beams reflected by the dispersive prism 32. The dispersive prism 32 is formed with a reflection coating on a surface opposite to a surface on which the laser beams are incident. Since the optical paths of the laser beams are bent by the dispersive prism 32, a space for arranging the optical elements of the scanning optical system 200 can be reduced. Further, since the monitor beams travel inside the dispersive prism 32 twice, the dispersive 32 prism may have smaller apex angle and thickness than the transmission type prism 31 according to the first embodiment.

The dispersive prism 32 has an apex angle of 6°, refractive indexes n680=1.77358 and n780=1.76591, a central thickness of 1.0 mm. The dispersive prism 32 is arranged such that a distance of the center of a surface on which the monitor beams are incident with respect to the optical axis Ax1 is 57.0 mm, and a line, which intersects the center of the surface of the dispersive prism 32 on which the monitor beams are incident and extends in a direction perpendicular to the optical axis Ax1, intersects the optical axis Ax1 at a point that is on a surface 15 side of the second lens 22 and spaced from the surface 15 side surface of the second lens 22 (i.e., the surface #5) by 10.0 mm.

The light receiving element 40 is located at a position space from the dispersive prism 32 by 109.2 mm. A separation amount of the two laser beams on the light receiving element 40 is 0.248 mm.

Third Embodiment

FIG. 4 shows an arrangement, within a main scanning plane, of optical elements of a scanning optical system 300 according to a third embodiment. The scanning optical system 300 is different from the scanning optical system 100 in that the fθ lens 20 is replaced with an fθ lens 50, the prism 31 is replaced with a transparent type dispersive diffraction element 33, and the light receiving element 40 is arranged so as to receive the laser beams diffracted by the diffraction element 33.

The fθ lens 50 includes a plurality of lens elements made of material having different dispersions so that the lateral chromatic aberration is compensated without employing a diffraction lens structure as in the first embodiment.

The fθ lens 50 includes, from the polygonal mirror 14 side to the surface 15 side, a first lens 51 having a weak negative power in the main scanning direction and a strong negative power in the auxiliary scanning direction, a second lens 52, which is a biconvex lens, having a week positive power in the main scanning direction and a strong positive power in the auxiliary scanning direction, a third lens 53 having a positive power both in the main and auxiliary scanning directions, and a fourth lens 54 having a negative power in the main and auxiliary scanning direction.

Since the lateral chromatic aberration is compensated as described above, the beam spots formed by the laser beams, which have different wavelengths and passed through the fθ lens 50, on the surface within the imaging area Rd are aligned in the main scanning direction. Since the beam spots are spaced from each other in the auxiliary scanning direction, two scanning lines are formed at each scan.

The dispersion diffraction element 33 is a transmission type diffraction element, and is located between the fourth lens 54 and the surface 15, at a position where the beams directed outside the imaging area Rd are incident. The beams incident on the diffraction element 33 will be referred to as monitor beams. The monitor beams are diffracted by the diffraction element 33 and the optical paths thereof are bent in a direction away from the optical axis Ax1. The monitor beams passed through the diffraction element 33 are converged on the light receiving element 40. In this configuration, the monitor beams traverse the light receiving element 40 in a direction indicated by arrow D2 before the beam spots scan within the imaging area Rd at every scan.

The dispersion diffraction element 33 is, macroscopically, a parallel plate like element, and diffraction gratings having minute steps are formed on a surface thereof. The minute steps are configured such that boundaries thereof extend in the auxiliary scanning direction, and a cross section taken along a plane perpendicular to the auxiliary scanning direction exhibits saw-tooth pattern.

The diffraction element 33 has a predetermined dispersion such that the first laser beam (wavelength: $\lambda 1$) emitted by the first laser diode 10a and the second laser beam (wavelength: $\lambda 2$) emitted by the second laser diode 10b are separated in the scanning direction D2 as indicated by solid and broken lines, respectively, in FIG. 4.

As the polygonal mirror 14 rotates in the counterclockwise direction, two pulse signals are generated by the light receiving element 40 at every scan, and the timings at which the two laser beams are modulated are adjusted based on the thus generated pulses.

A numerical example of the scanning optical system 300 will be described. In this example, the wavelength $\lambda 1$ is 730 (nm) and the wavelength $\lambda 2$ is 780 (nm). TABLE 3 below indicates a numerical structure of the scanning optical system 300 on the surface side elements with respect to the polygonal mirror 14. In TABLE 3, surface #1 represents a reflection surface of the polygonal mirror 14, surfaces #2 and #3 represent those of the first lens 51, surfaces #4 and #5 represent those of the second lens 52, surfaces #6 and #7 represent those of the third lens 53, surfaces #8 and #9 represent those of the fourth lens 54 of the fθ lens 50.

TABLE 3

| scanning width 314 mm | | | | focal length in the main | |
|---|---|---|---|---|---|
| surface | | | | scanning direction 329.55 mm | |
| number | ry | rz | d | n730 | n780 |
| #1 | inf. | | 85.960 | | |
| #2 | −661.400 | | 12.000 | 1.63779 | 1.63552 |
| #3 | inf. | 99.320 | 12.630 | | |
| #4 | 816.500 | | 33.700 | 1.58382 | 1.58252 |
| #5 | −203.050 | −44.300 | 22.400 | | |
| #6 | −912.000 | | 31.300 | 1.58382 | 1.58252 |
| #7 | −180.406 | | 12.000 | | |
| #8 | −166.058 | | 10.000 | 1.76935 | 1.76591 |
| #9 | −337.500 | | 281.850 | | |

Surface #3 (i.e., the surface 15 side surface of the first lens 51) is a cylindrical surface, surface #5 (i.e., the surface 15 side surface of the second lens 52) is a toric surface, and the other surfaces of the fθ lens are spherical surfaces.

The dispersive diffraction element 33 is a transparent type diffraction element, grating pitch of which is 349 per 1 mm, refractive indexes are n730=1.48721 and n780=1.48617, and the thickness is 2.0 mm. A distance between the center of the beam receiving surface of the diffraction element 33 and the optical axis Ax1 is 142.655 mm. A line intersecting the center of the light receiving surface of the diffraction element 33 and extending in a direction perpendicular to the optical axis Ax1 intersects the optical axis Ax1 on a surface 15 side of the fourth lens 54 at a point 150.0 mm spaced from the surface #9 (i.e., the surface 15 side surface of the fourth lens 54). The light receiving element 40 is spaced from the diffraction element 33 by 126.7 mm. The separation amount of the two beams on the light receiving element is 2.328 mm.

Fourth Embodiment

FIG. 5 shows an arrangement, within a main scanning plane, of optical elements of a scanning optical system 400 according to a fourth embodiment. The scanning optical system 400 is similar to the scanning optical system 300 except that the transparent type diffraction element 33 is replaced with a reflective type dispersive diffraction element 34 formed with a reflective coating on a surface thereof, and the light receiving element 40 is arranged to receive the beams reflected by the reflective type dispersive diffraction element 34. Since the optical paths of the monitor beams are bent by employing the reflective type element, the space required for the entire optical system can be reduced.

The dispersive diffraction element 34 is a reflection type diffraction element, grating pitch of which is 174.5 per 1 mm. A distance between the center of the beam receiving surface of the diffraction element 34 and the optical axis Ax1 is 142.655 mm. A line intersecting the center of the light receiving surface of the diffraction element 34 and extending in a direction perpendicular to the optical axis Ax1 intersects the optical axis Ax1 on a surface 15 side of the fourth lens 54 at a point 150.0 mm spaced from the surface #9 (i.e., the surface 15 side surface of the fourth lens 54). The light receiving element 40 is spaced from the diffraction element 34 by 143.0 mm. The separation amount of the two beams on the light receiving element 40 is 1.215 mm.

According to the optical scanning systems configured as above, the scanning range of each beam can be suppressed within the imaging area, and thus, the size of the polygonal mirror is remained as small as possible. Further, the timings at which the beams traverse the light receiving element are differentiated so that synchronizing signals for respective beams can be generated. Therefore, the imaging start position can be accurately adjusted. Further, the imaging start points for the two laser beams can be adjusted in the main scanning direction even if the relative positions of the beam spots are shifted due to the error in the initial settings or some external disturbance.

The present disclosure relates to the subject matter contained in Japanese Patent Application No. 2000-400183, filed on Dec. 28, 2000, which is expressly incorporated herein by reference in its entirety.

What is claimed is:

1. A scanning optical system used for exposing a predetermined imaging area on a surface to be scanned to a plurality of laser beams, comprising:
   a plurality of light sources that emit a plurality of laser beams having different wavelengths, respectively;
   a single deflector which deflects the plurality of laser beams simultaneously;
   an imaging optical system that converges the plurality of laser beams deflected by said single deflector on the surface to be scanned, lateral chromatic aberration of said imaging optical system being compensated;
   a beam detector that receives the plurality of laser beams directed to outside the predetermined imaging area, a synchronizing signal being generated upon detection of each of the plurality of light beams by said beam detector;
   a dispersion element inserted in optical paths of the laser beams directed to said beam detector, said dispersion element being configured such that the laser beams directed to said beam detector are shifted in the scanning direction.

2. The scanning optical system according to claim 1, wherein said beam detector detects the laser beams passed through at least a part of said imaging optical system.

3. The scanning optical system according to claim 1, wherein said beam detector comprises a single light receiving element, each of the plurality of laser beams being incident on said single light receiving element.

4. The scanning optical system according to claim 3, wherein the plurality of laser beams incident on the imaging area are aligned in the scanning direction, and wherein the plurality of laser beams are incident on said beam detector at different timings.

5. The scanning optical system according to claim 1, wherein said dispersion element includes a prism.

6. The scanning optical system according to claim 1, wherein said dispersion element includes an optical element formed with a diffraction surface which separates the plurality of laser beams in the scanning direction.

7. The scanning optical system according to claim 1, wherein said dispersion element includes a reflection type optical element that bends optical paths of the plurality of laser beams.

\* \* \* \* \*